May 5, 1964 M. N. CROWE 3,132,007
PORTABLE TUBE DRYER WITH ROTARY AGITATOR AND EXTERNAL HEATING MEANS
Filed March 14, 1963 3 Sheets-Sheet 1
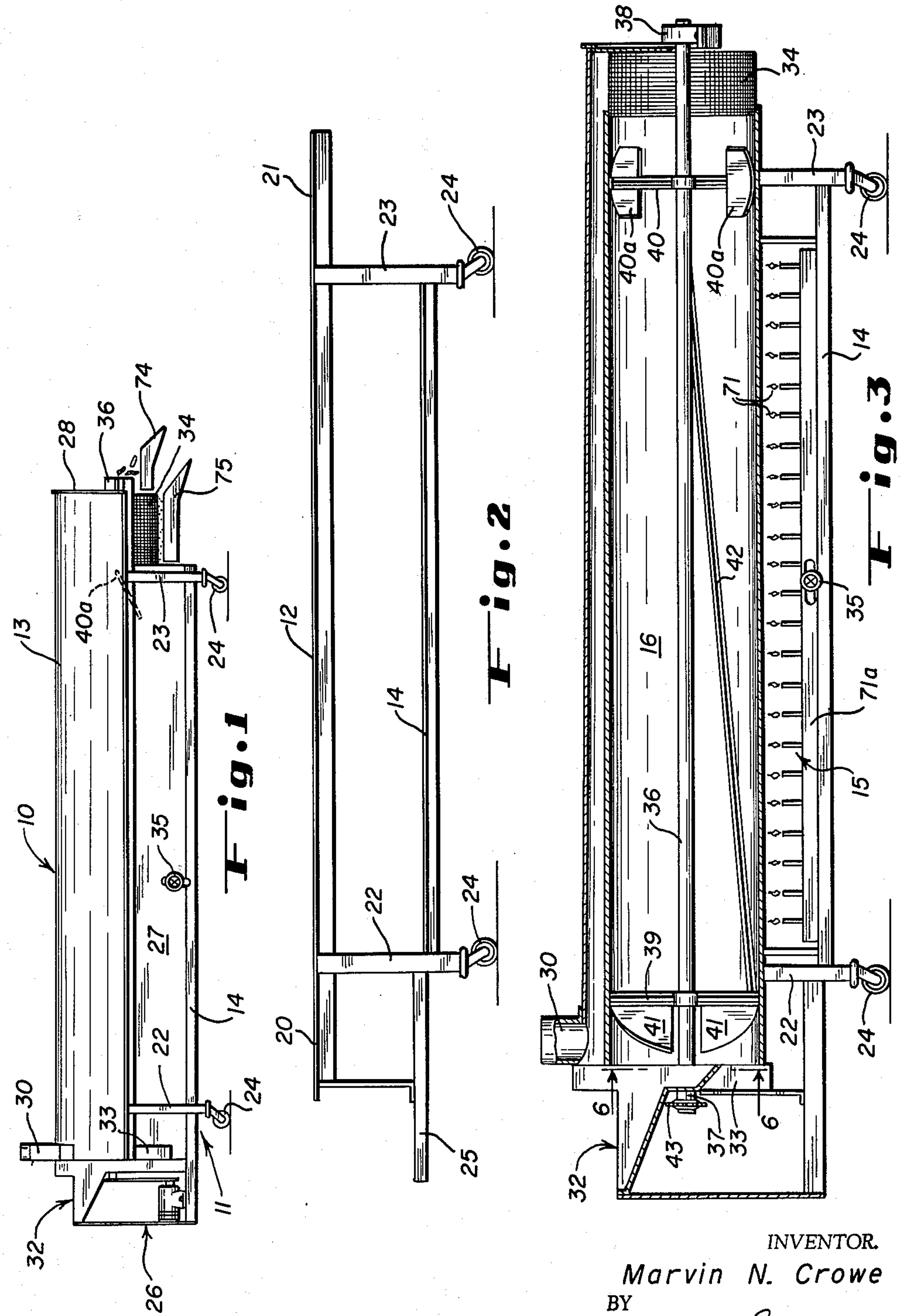
INVENTOR.
Marvin N. Crowe
BY
McGrew & Edwards
ATTORNEYS INVENTOR.
Marvin N. Crowe
BY
[signature]
ATTORNEYS INVENTOR.
Marvin N. Crowe
BY
McGrew & Edwards
ATTORNEYS 3,132,007

PORTABLE TUBE DRYER WITH ROTARY AGITATOR AND EXTERNAL HEATING MEANS

Marvin N. Crowe, 2075 S. Platte River Drive, Denver 23, Colo.

Filed Mar. 14, 1963, Ser. No. 265,128
4 Claims. (Cl. 34—183)

This invention relates to a dehydrator and more particularly to a portable dehydrating oven for use in the treatment of certain pre-cooked food products. Processes for the commercial preparation of deep-fat fried, pre-cooked food products, such as deep-fried chips, cakes, etc., made from potatoes, corn meal, etc. to produce a crisp, package product with an acceptable shelf life are rather complicated. These processes require careful control of operating variables, such as temperature limits, humidity, rate of drying, etc., and have generally necessitated commensurately expensive and complicated machinery for handling such products.

This application is a continuation-in-part of applicant's copending application for Letters Patent, Serial Number 96,184, filed March 16, 1961 for "Dehydrator," now abandoned.

The present invention provides a portable oven which is simple, inexpensive, and particularly efficient in dehydrating or drying frangible deep-fried food products and the like. It produces a uniform, controlled heating of the dehydrating chamber in combination with a gentle tumbling agitation and slow movement of the material being treated. There is, also, provision for a confined passage for countercurrent flow of heat transfer medium completely around the periphery of the dehydrating chamber to thereby maintain an efficient heat balance throughout the chamber.

In one of its embodiments, apparatus according to my invention is comprised of an elongated tubular dehydrating chamber or oven mounted above a selectively adjustable burner assembly and both are carried by a unitary frame within a substantially closed cover spaced from the outside of said chamber to provide a confined heating passage therearound. Substantially concentrically mounted within the same chamber is a rotary impeller and agitator assembly adapted to slowly move through the chamber with gentle tumbling and agitation of the frangible food product being treated. Partial augers are provided on the impeller and agitator assembly to slowly and uniformly move the food product through the chamber from the inlet and to move the product from the outlet. Further details of construction are set forth hereafter in the detailed description of the appended drawings.

It is thus among the advantages and features of my invention to provide simple, relatively inexpensive and easily operated portable apparatus for dehydrating friable or frangible materials, particularly food materials, which provides for a slow movement of friable products through a dehydrating oven with gentle tumbling and agitation substantially without breakage. The device further provides means for adequate control of humidity, heating, etc., and also provides means for maintaining an efficient heat balance, thereby maintaining low operating costs.

Many other features and advantages will become apparent to those skilled in the art from a study of the following detailed description of the drawings. In these drawings:

FIG. 1 is a side elevation of dehydrator apparatus constructed according to my inventive concepts;

FIG. 2 is a side elevation, slightly enlarged, of the portable unitary frame of the apparatus of FIG. 1;

FIG. 3 is an enlarged detail view in partial section of the apparatus of FIG. 1;

Figures 4, 4A, 5, 6:
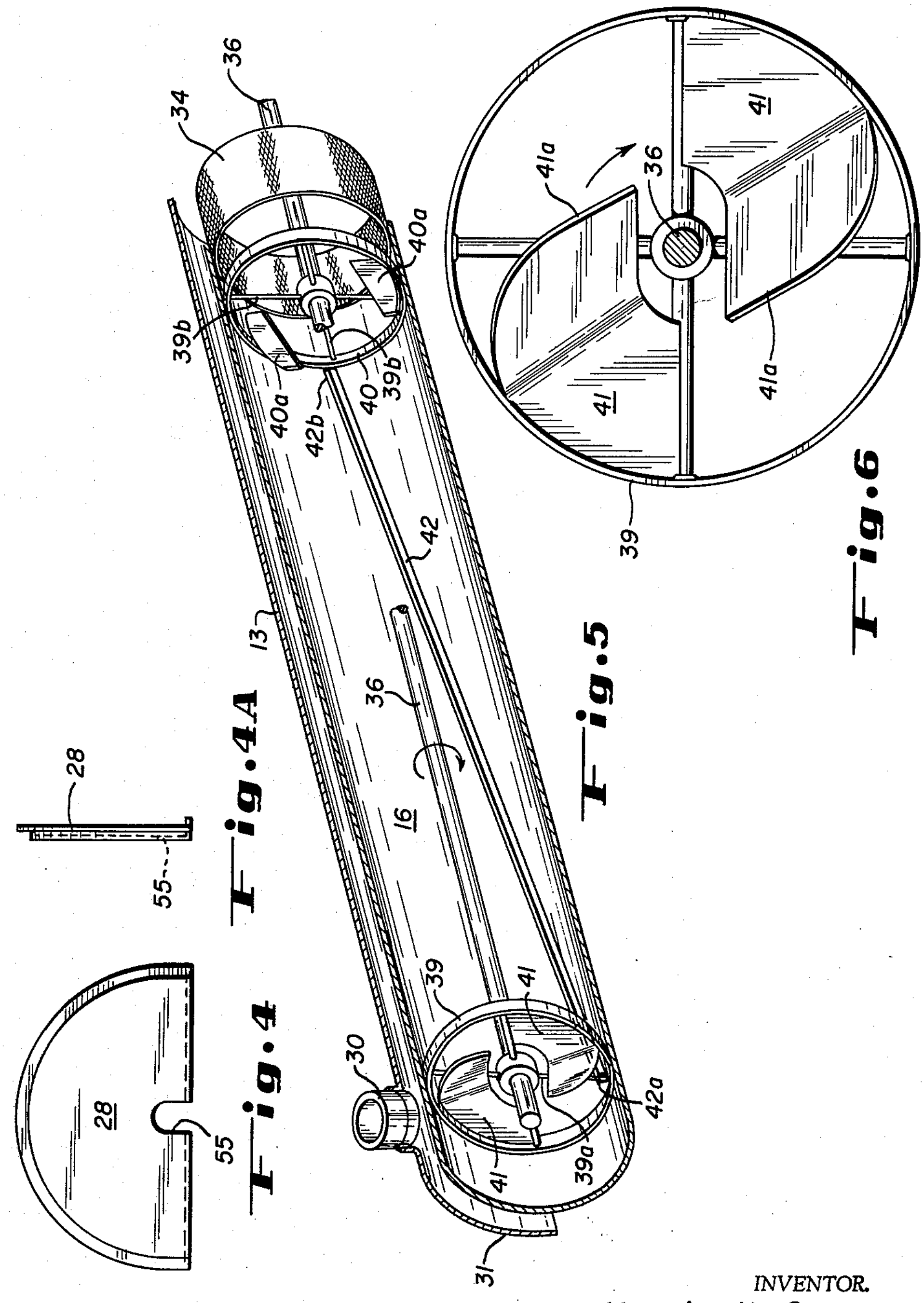
Figure 7:
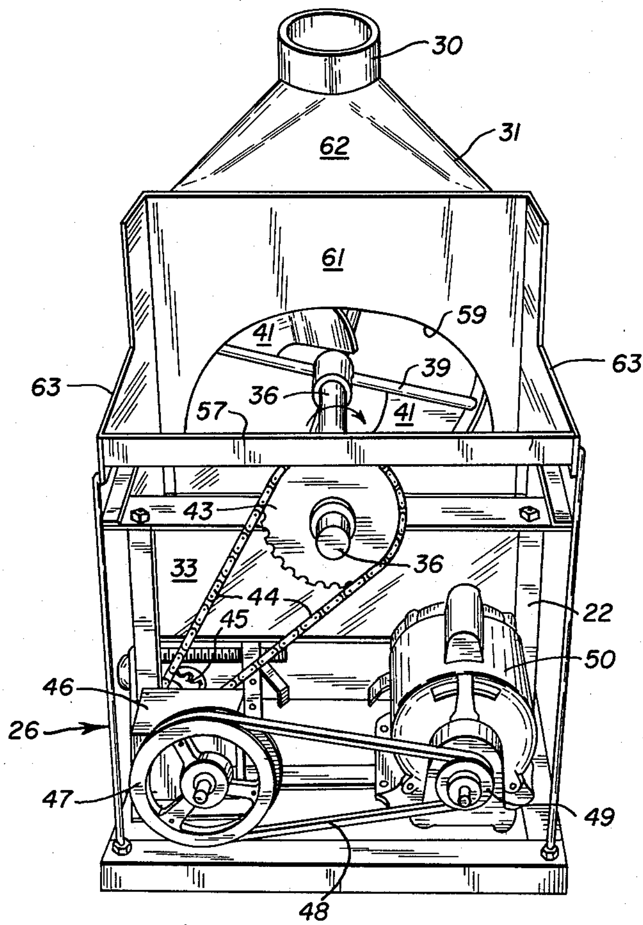
Figure 8:
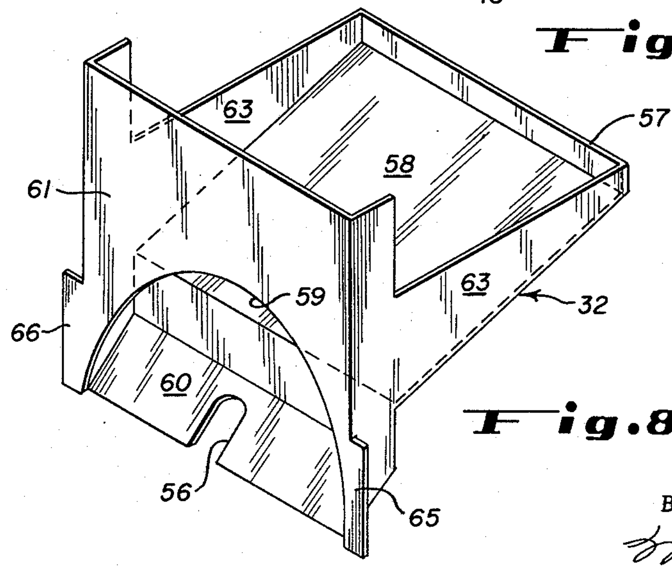

FIGS. 4 and 4*a* are an end view and a side view, respectively, of an end cover usable with the apparatus of FIG. 1;

FIG. 5 is an enlarged isometric view in partial section of a portion of the apparatus of FIGS. 1 and 3;

FIG. 6 is an enlarged detail view of a portion of the apparatus of FIG. 5;

FIG. 7 is an enlarged, isometric, detail view from the inlet end of the apparatus of FIG. 1; and FIG. 8 is an enlarged, isometric, detail view of the feed hopper and inlet assembly for the apparatus of FIGS. 1 and 3.

Before describing the drawings in detail I wish it understood that they are but exemplary of apparatus embodying my inventive concepts, and that the spirit and scope of my invention is as defined in the hereafter set forth claims.

The elements which go to make up a dehydrator assembly, shown generally by numeral 10, according to my invention are preferably adapted to be mounted on a unitary floor-supported frame 11. The frame 11 includes a pair of spaced apart horizontal upper members 12 adapted to support a tubular drying chamber 16 and its arcuate outer cover 13 spaced from the chamber. The frame includes a second pair of horizontal members 14 spaced a distance below the first ones, adapted to support the burner assembly 15 (FIG. 3) below the dehydrator oven or chamber 16. The upper horizontal frame members 12 also include forward and rear portions 20 and 21 which extend past the vertical frame members 22 and 23, respectively. Suitable full caster wheels 24 are mounted on the bottom of the vertical frame members for ease of movement and commensurate mobile portability. A lower horizontal frame member 25 extends forwardly from the vertical member 22 for support of the drive assembly 26 (best shown in FIG. 7 and discussed in detail hereafter). A side cover 27 is suspended from each side of the arcuate top cover 13, and an end plate 28 (FIGS. 4 and 4*a*) substantially completes the housing for the dehydrating oven 16.

The forward end of the assembly 10 includes an upwardly opening exhaust stack 30 having an enlarged, arcuately shaped bottom portion 31 (see FIG. 5) adapted for complementary seating with the cover 13. A novel feed inlet and chute assembly 32 (best shown in FIG. 8 and discussed in detail hereafter) and a bottom pan or plate 33 complete the forward end of the assembly 10. A discharge screen 34, which is partially shown in FIG. 1, completes the opposite end of the assembly. A valve 35, outside the side cover 27, FIG. 1, provides selective adjustment of the burner assembly 15.

Interiorly of and extending substantially concentrically through the dehydrating oven 16 is an elongated rotary shaft 36 (FIGS. 3 and 5). The shaft 36 is journaled in position within the oven by forward bearing support 37 and rear bearing support 38. The bearing assemblies of the supports have not been shown in detail for purposes of drawing simplicity. Mounted on the rotary shaft, and spaced inwardly of the inlet and outlet, respectively, are a pair of centrally apertured spider assemblies 39 and 40.

Extending outwardly from the spider assembly 39 is a pair of partial auger blades 41. Each of the auger blades is substantially identical in construction and is mounted on the ring of the spider 39 with portions **41*a* extending into the feed area of the dehydrator (see FIG. 6), and both blades are pitched at substantially the same angle. At the discharge end partial auger blades 40*a* are mounted on the ring of spider 40, with the blades pitched in the same direction as blades 41. This same blade pitch of both auger blades achieves unidirectional motivating force, i.e., from inlet to outlet, with the inlet augers slowly pushing the material through the oven. The outlet augers provide a positive discharge of material over the screen 34**.

An elongated agitator member 42 is an important feature of the agitator-impeller combination of the dehydrator assembly 10. The member is connected by its opposite ends on the spider rings adjacent a spoke of one of the spider assemblies. The ends of member 42 are rotated 90° with respect to each other. See FIG. 5 in particular wherein the end 42*a* of the impeller member is affixed to the spider assembly 39 adjacent the spoke 39*a*, and the opposite end 42*b* is affixed adjacent the spoke 39*b* of the spider assembly 40. The foregoing maintains the agitator member 42 in a 90° quadrant of the inner surface of the oven 16, providing a partial helix of reverse pitch to the impeller blades, providing a gentle slope. The partial reverse helix configuration of the impeller member 42 provides a gentle tumbling and agitation of food material passing through the oven 16, preventing crowding at the discharge end. Further, because of its novel positioning within a 90° quadrant in the oven there is only a partial agitation force delivered along the bed of material for each revolution of the agitator-impeller assembly. Thus, agitation only occurs along the bottom portion of the oven 16, since the agitator in the upper portion of the oven is in a position above the bed of material. However, as the agitator progresses through the bed of material it gently tumbles the material with a slight tendency of reverse movement of material, thereby preventing crowding and breaking at the outlet. This provides a periodic agitation to the food material being treated in the chamber or oven 16.

The outer end of the shaft 36 extending beyond the oven 16 and adjacent the support 37 has a sprocket 43 mounted thereon for driving attachment (FIG. 7) with an endless drive chain 44. The chain 44 passes around the driving sprocket 45, which is connected with a speed reducer 46. A pulley 47 on the drive shaft of the speed reducer is engaged through a V-belt 48 with a pulley 49 of electric motor 50. This arrangement provides for the necessary rotary motion for the impeller-agitator structure carried on the shaft 36. Preferably the rotation is slow, on the order of three or four r.p.m.

The cover 28 for the discharge end of the assembly 10 has a centrally located, generally arcuately shaped aperture 55 for fitting over the shaft 36. Similarly, the feed inlet and chute assembly 32 has an aperture 56 for fitting over the forward end of the shaft 36. Essentially, the inlet and feed chute assembly includes an enlarged pan section 57 having a downwardly sloping, inwardly converging bottom portion 58 which feeds through the arcuate inlet 59 above the sharply sloping bottom section 60. The arcuate inlet 59 provides an opening through the upstanding end section 61 interconnecting sides 63. The end section 61 abuts the front side 62 of the exhaust portion of the apparatus. The upstanding end section 61 rises a substantial distance above the sides 63 of the pan section to prevent spillage, etc., of material being directed into the chute. The lower side edges of the end 61 are provided with outwardly extending flanges 65 and 66 which key into pan 33 to complete the closing of the forward end of chamber 16 below the inlet 59.

The valve 35 (FIG. 3) controls the flow of fuel gas to the manifold 71*a* from which open a plurality of spaced burner outlets 71 for the purpose of obtaining the desired heating of the chamber 16.

The treated dehydrated food product is discharged across the screen 34 at the oven outlet across chute 74 into suitable receptacles for subsequent packaging as desired. The screen is a desirable adjunct to the apparatus in that it screens out fines which are discharged from chute 75 and permits some cooling of the product material before discharge into the chute 74 and a receptacle.

The invention has particular use, as noted above, in the treatment of fried foods, such as corn meal chips and other collectic cakes and the like, potato chips, etc. Also, because of the gentle periodic agitation and tumbling action of the agitator member 42, undesirable breakage of friable food material is substantially reduced. The novel arrangement of feed auger blades, which uniformly push the feed material through the chamber, and the discharge augers which push the material over the screen 34, assures the direction of a small flow of air concurrently with the material flow. The concurrent material and air flow is countercurrent to the hot gases passing through the confined passageway 70 toward the exhaust stack 30. This arrangement provides an excellent uniform heat distribution for the oven assembly, both by direct flame heating and by the flow of hot gases completely around the oven.

In operation, therefore, fried material to be dehydrated is charged in the feed chute from which it progresses by gravity down the sloping bottom portions 58 and 60, through inlet 59 into contact with the partial auger blades 41 associated with the spider assembly 39. The slow revolution of the augers gently pushes the material through the oven after the operation reaches equilibrium. The intermittent tumbling agitation of the agitator member 42 periodically slowly agitates the material as it moves through the chamber for the dehydrating treatment. After passage through the oven 16 the discharge auger blades 40*a* of the spider assembly 40 gently push the friable dehydrated material across the discharge screen 34 and onto chute 74.

Having described my invention in sufficient detail and particularity as to enable those skilled in the art to practice it, what I desire to have protected by Letters Patent is set forth in the following claims.

I claim:

1. A portable dehydrator assembly for use in the dehydration of friable food products including an elongated substantially tubular oven mounted on a floor-supported frame, an inlet adjacent one end and an outlet adjacent the other end of said oven and means adapted to maintain a bed of material along the length of said oven, said inlet including a feed hopper adapted for gravity discharge of feed into said inlet, first impeller means mounted adjacent said inlet including means adapted to assist movement of material from the discharge from said feed hopper into said oven, second impeller means adapted to intermittently contact a bed of material in said oven to move the material being treated through the oven by periodic tumbling agitative movement, said second impeller including an elongated impeller member of a generally partial helix configuration mounted in contact with substantially only one quadrant of the internal surface of the tubular oven to provide periodic contact with a bed of material in said oven, third rotary impeller means adjacent said outlet adapted to assist removal of material from the oven, said first and third rotary impeller means being spoked, bladed spider assemblies mounted on a rotary shaft extending through said oven, means defining a confined passage around a substantial portion of the outside of said oven and including an exhaust member mounted adjacent the inlet adapted for egress of heat exchange medium moving countercurrent to the material flow, means for heating said oven, and means for imparting motion to said first, second and third impeller means.

2. The assembly described in claim 1 in which the blades of said bladed spider assemblies are all pitched at substantially the same angle.

3. The assembly described in claim 1 in which said elongated impeller member is attached at each end to one of said spider assemblies at 90° relative to each other.

4. A portable dehydrator assembly for use in the dehydration of friable food products including an elongated substantially tubular oven mounted on a floor-supported frame, an inlet adjacent one end and an outlet adjacent the other end of said oven and means adapted to maintain a bed of material along the length of said oven, said inlet including a feed hopper adapted to feed material into said oven, first impeller means including means adapted to assist movement of material into said oven, second impeller means adapted to intermittently contact a bed of material in said oven to move the material being treated through the oven by periodic tumbling agitative movement, said second impeller including an elongated impeller member of a generally partial helix configuration mounted in contact with substantially only one quadrant of the internal surface of the tubular oven, third rotary impeller means adjacent the outlet adapted to assist removal of material from the oven, said first and third rotary impeller means being spoked, bladed spider assemblies mounted on a rotary shaft extending through said oven, a tubular discharge screen mounted adjacent the outlet of said oven and extending beyond said outlet whereby material discharging from said third rotary impeller means is progressively pushed across said screen for cooling prior to its discharge from the assembly, means defining a confined passage around a substantial portion of the outside of said oven and including an exhaust member mounted adjacent the inlet adapted for egress of heat exchange medium moving countercurrent to the material flow, means for heating said oven, and means for imparting motion to said first, second and third impeller means.

References Cited in the file of this patent

UNITED STATES PATENTS

| | | |
|---|---|---|
| 288,782 | Edwards | Nov. 20, 1883 |
| 1,773,202 | Rosenfield | Aug. 19, 1930 |
| 2,021,012 | McCullough | Nov. 12, 1935 |
| 2,452,249 | Leiske | Oct. 26, 1948 |

FOREIGN PATENTS

| | | |
|---|---|---|
| 24,480 | France | Apr. 4, 1922 |